United States Patent [19]

Edwards

[11] Patent Number: 4,922,354
[45] Date of Patent: May 1, 1990

[54] DISK DRIVE AIR FILTER

[76] Inventor: William J. Edwards, 1404 N. McMillan, Oklahoma City, Okla. 73127

[21] Appl. No.: 121,695

[22] Filed: Nov. 16, 1987

Related U.S. Application Data

[63] Continuation-in-part of Ser. No. 112,198, Oct. 26, 1987, Pat. No. 4,819,105.

[51] Int. Cl.⁵ .............................................. G11B 5/012
[52] U.S. Cl. .................................................. 360/97.03
[58] Field of Search .................................. 360/97–99, 360/97.02, 97.03, 98.08, 99.12

[56] References Cited

U.S. PATENT DOCUMENTS 4,308,041 12/1981 Ellis .................................. 360/97 X

FOREIGN PATENT DOCUMENTS 60-261091 12/1985 Japan ................................. 360/97.03

OTHER PUBLICATIONS

IBM T.D.B., vol. 26, #2, Jul. 1983, J. Elliott, et al; Filter Arrangement for Rigid Disk File Internal Air Cir.

Primary Examiner—A. J. Heinz
Attorney, Agent, or Firm—Robert K. Rhea

[57] ABSTRACT

An air filter for filtering air within a closed housing, such as a disk drive, having spacers surrounding a disk driving hub between adjacent disks in which angular rotation of the disks generate a radial and rotational stream of air across the surfaces of the disks. The filter includes an annular ring of filter media supported by the respective spacer. The air stream generated by the angular rotating disks flows radially throughout the full 360° of the filter media ring in an inward and/or outward direction.

11 Claims, 1 Drawing Sheet

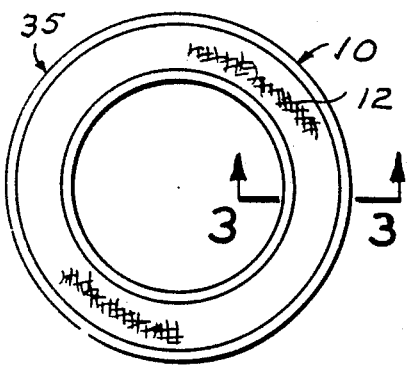
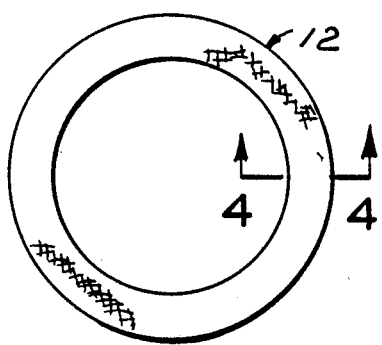
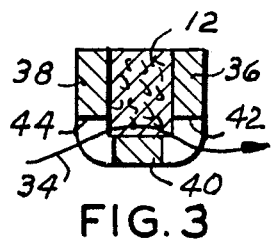
FIG.1  FIG.2  FIG.3
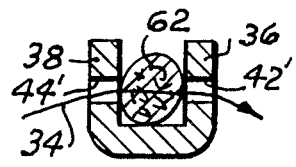
FIG.6
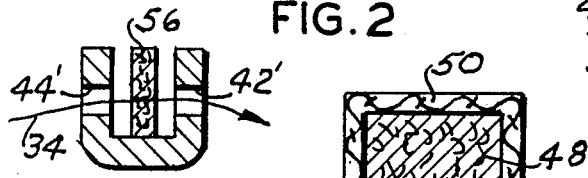
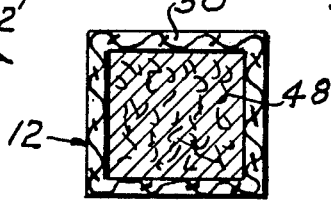
FIG.8  FIG.4
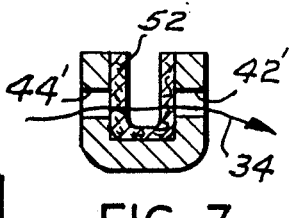
FIG.7
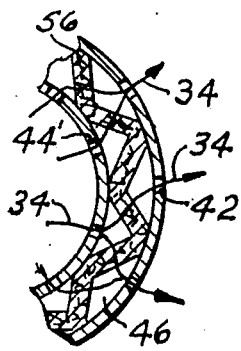
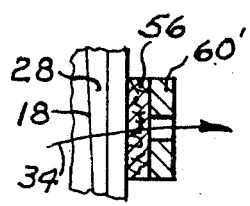
FIG.9  FIG.11  FIG.10
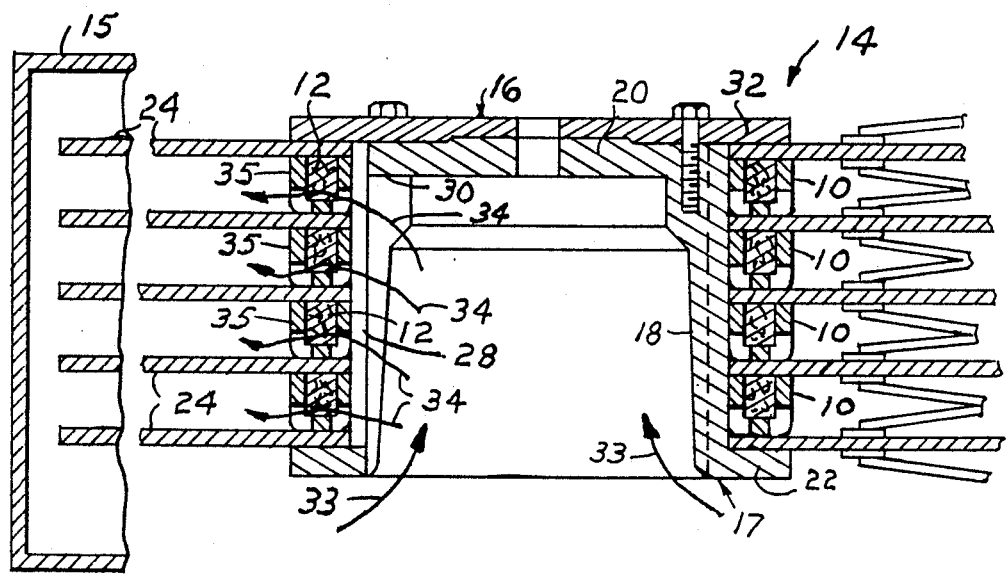
FIG.5

DISK DRIVE AIR FILTER

CROSS REFERENCE TO RELATED APPLICATION

This application is a continuation-in-part of an application filed by me in the U.S. Patent and Trademark Office on Oct. 26, 1987, under Ser. No. 06/112,198 now U.S. Pat. No. 4,819,105, for SPACER FOR DISKS IN A DISK DRIVE.

BACKGROUND OF THE INVENTION

1. Field of the Invention

The present invention relates to disk drives and more particularly to a filter interposed between disks in a disk drive.

It is presently common practice to electronically store data on magnetic disks for processing and retrieving such data as desired. One form of such data storage device is commonly referred to as a "hard disk drive" which basically comprises a series of superposed disks in which the opposing flat surfaces thereof receive and store the data. The data is accessed by "heads" from respective surfaces of the several disks. The disks surround a driven hub which angularly rotates the several disks in unison. The angular rotation of the disk generates an air stream across the surfaces of the disks which helps in preventing dust particles or other contaminants from adhering to the magnetic disks.

This invention provides an improved filter for the disks of a hard disk drive which filters air between the several disks throughout the full 360° of the disk drive hub.

2. Description of the Prior Art

Air filters for magnetic data disk drives have generally comprised filter units which are located adjacent an inner wall surface of the housing or shroud enclosing a magnetic disk unit.

The air filters of this invention are believed unique and distinctive over prior art and generally used air filters for air filtering systems by providing a filter which is located between adjacent disks and adjacent the hub thereof. To accomplish this the filters of this invention utilize the disk spacer disclosed in my above identified application. The disk spacer, being necessary, it is believed, to support the filters of this invention.

SUMMARY OF THE INVENTION

The disk drive air filters of this invention principally comprise an endless ring type filter of a desired toric cross section formed from selected filtering media capable of attracting or screening minute particles from an air stream flowing radially in the area between adjacent disks. One of the filters of this invention being supported between each two adjacent disks adjacent the disk driving hub so that the full 360° peripheries of the filter ring filters the air stream between each two adjacent disks.

The principal object of this invention is to provide an air filter for magnetic data disk drives, preferably supported by the several disk spacers, which closely surrounds the hub of the disk drive unit in the space between each two adjacent disks wherein the radially flowing air stream, by the angular rotation of the disks, maintains such air stream free of contaminants by its being located at an optimum point in the air stream thereby greatly increasing the volume of air passing through the filter media.

BRIEF DESCRIPTION OF THE DRAWINGS

FIG. 1 is a top view of a disk spacer containing air filter media;

FIG. 2 is a top view of the air filter contained by the disk spacer of FIG. 1;

FIGS. 3 and 4 are vertical cross sectional views, to larger scales, taken substantially along the lines 3—3 and 4—4 of FIGS. 1 and 2, respectively;

FIG. 5 is a fragmentary vertical cross sectional view illustrating the relative position of the disk spacer and filter of FIG. 1 when installed in a disk drive;

FIGS. 6, 7 and 8 are vertical cross sectional views similar to FIG. 3 illustrating other cross sectional configurations of air filter media supported by the disk spacer of FIG. 1;

FIG. 9 is a fragmentary top view of a disk spacer containing a fan-fold type configuration of filter media; and, FIGS. 10 and 11 are vertical cross sectional views illustrating alternative embodiments of the air filter.

DESCRIPTION OF THE PREFERRED EMBODIMENTS

Like characters of reference designate like parts in those figures of the drawings in which they occur.

In the drawings:

Referring first to FIGS. 1 through 5, the reference numeral 10 indicates a disk spacer, of the type disclosed in my above referred to copending application, containing a filter media ring 12, as hereinafter explained in more detail.

One of the combination spacer-filter units 10 is interposed between each two adjacent disks in a disk drive 14 (FIG. 5).

The disk drive 14, includes a shroud or housing 15, enclosing a disk unit 16 having a generally cylindrical spindle or hub 17. The hub is characterized by an annular wall 18 and an integral top wall 20 at its upper end, as viewed in the drawings. An outstanding flange 22, at the depending limit of the wall 18, forms an annular shoulder for supporting the lowermost one of a superposed series of disks 24 surrounding the hub. One of the filter equipped spacers 10 surrounds the hub 17 between adjacent disks. The hub wall 18 is further provided with a series of circumferentially spaced-apart longitudinally coextensive recesses 26 forming an air flow space 28 between the periphery of the hub and the inner periphery of the respective disks and the several spacers 10 for the purposes presently explained. Further, the hub wall 18 is provided with a like plurality of vertically elongated slots 30 extending downwardly from its upper wall 20 and centrally disposed with respect to the width of the recesses 26 for permitting air flow through the hub wall.

A clamp plate 32 overlies the topmost disk and impinges the several disks and spacers against the shoulder formed by the hub wall flange 22.

A motor, not shown, angularly rotates the hub and disk assembly which generates radial air flow toward the hub interior in the direction of the arrows 33. The air passes outward through the hub wall, through the spacer apertures and across the adjacent surfaces of the respective disks in the direction of the arrows 34.

The above description of the disk drive 14 is conventional with one type of disk drive and forms no part of the invention other than to set forth an example of a disk drive utilizing the air filter media of this invention.

Referring again to FIGS. 1 through 4, the spacer of the filter unit 10 comprises an annular sheet metal spacer 35 of general U-shape in toric cross section defining parallel outer and inner legs 36 and 38 integrally joined by a planar bight portion 40.

The ring 35 is provided with a pair of radially spaced rows of apertures 42 and 44 at the intersection of the respective leg or wall 36 and 38 with the bight portion 40 with the apertures of each row of apertures being circumferentially spaced-apart and staggered with respect to the apertures in the other row. The U-shape of the spacer 35 thus defines a recess or annulus 46 (FIG. 9) with which the apertures 42 and 44 communicate. The apertures 42 and 44 may be disposed medially the vertical dimension of the legs 36 and 38, as at 42' and 44'.

Prior to inserting the spacer 35 between adjacent disks 24, filter media, such as the ring 12, is placed in the spacer annulus 46. The spacer ring 12, by way of example, comprises a selected commercially available fibrous material 48, such as the filter media presently marketed under the trademark Filtrete comprising a plastic fiber commonly referred to as electrostatic polypropylene. This Filtrete product may be obtained from the Occupational Health & Safety Products Division/3M, 220-7W 3M Center, St. Paul, Minn. 55144. The filter media 48, in the ring 12, is surrounded by a fine mesh scrim 50.

Obviously, other filter media may be used, for example expanded polytetrafluoroethylene presently marketed under the trademark Gore-Tex. This filter media may be obtained from W. L. Gore & Associates, Inc., Filtrations Products, P.O. Box 1100, Elkton, Md. 21921 in thin membrane-like sheets and laminated between opposing layers of scrim 50. Such a layer of filter media, indicated at 52 (FIG. 7), may be disposed in the U-shape of the spacer 35 in substantially contiguous contact with the inner wall surface defining the U-shape.

Obviously, the selected filter media may be formed in the shape of an endless band-like ring 56 and disposed vertically edgewise on the inner surface of the spacer bight 40 between the walls 36 and 38.

Alternatively, as illustrated by FIG. 9, the band-like configuration, indicated at 56', may be constructed in fan-fold configuration and disposed edgewise in the spacer annulus 46 with the fold lines of the filter media vertically contacting the inner wall surfaces of the U-shape legs 36 and 38 medially the position of the respective apertures 42' and 44'. Obviously, the filter media band 56 may be interposed between concentric band-like rings 58 and 60 surrounding the hub 16 (FIG. 10).

Alternatively, the filter media band 56 may be interposed between a similar spacer band ring 60' and the hub 16 (FIG. 11). Obviously, the chosen filter media may be formed in rope or strand fashion, as indicated at 62 (FIG. 6).

Obviously, the invention is susceptible to changes or alterations without defeating its practicability. Therefore, I do not wish to be confined to the preferred embodiment shown in the drawings and described herein.

I claim:

1. In a data access and storage hard disk drive having a pair of disks surrounding and angularly rotated by a central hub and having an annular disk spacer surrounding the hub and interposed between said pair of disks, said spacer having an annular recess and transverse apertures communicating with the recess, the improvement comprising:
   an annular ring of air filter media disposed in the recess.

2. The air filter according to claim 1 in which said filter means includes:
   closely spaced fibrous material; and,
   scrim means encapsulating the fibrous material.

3. The combination according to claim 1 in which the filter media comprises:
   electrostatic polypropylene; and,
   scrim means surrounding the electrostatic polypropylene.

4. The air filter according to claim 1 in which the filter means is an endless band-like ring disposed substantially normal to the direction of flow in said air path.

5. The air filter according to claim 1 in which the filter material is characterized by an expanded fan fold configuration alternately contacting respective opposing annulus forming walls of the spacer between respective adjacent foramina therein.

6. The combination according to claim 1 in which the filter media comprises:
   expanded polytetrafluoroethylene.

7. A filter for fluid circulated between rotating planar disks within a closed housing by angular rotation of a central hub structure within the housing, comprising:
   rigid body means including a one-piece annular ring U-shaped in toric cross section having transversely apertured walls interposed in the path of fluid circulation and surrounding the hub; and,
   filter media disposed between said walls in a manner permitting free flow of fluid transversely through the filter media and said walls.

8. The fluid filter according to claim 7 in which the filter media includes:
   expanded polytetrafluoroethylene.

9. The fluid filter according to claim 7 in which the filter media comprises:
   a laminated sheet substantially contiguously contacting the inner wall surfaces defining the U-shape.

10. The fluid filter according to claim 7 in which the filter media includes:
    closely spaced fibrous material; and,
    fine mesh scrim enclosing said fibrous material.

11. The fluid according to claim 7 in which the filter media includes:
    electrostatic polypropylene; and,
    fine mesh scrim enclosing said electrostatic polypropylene.

* * * * *